United States Patent
Bergner

(10) Patent No.: US 7,860,984 B2
(45) Date of Patent: Dec. 28, 2010

(54) METHOD AND DEVICE FOR THE CREATION OF A COMMUNICATION SYSTEM BASED ON CAN COMMUNICATION CONTROLLERS FEATURING AN INCREASED DATA THROUGHPUT

(75) Inventor: Alexander Bergner, Vienna (AT)

(73) Assignee: Tttech Computertechnik Aktiengesellschaft, Vienna (AT)

( * ) Notice: Subject to any disclaimer, the term of this patent is extended or adjusted under 35 U.S.C. 154(b) by 0 days.

(21) Appl. No.: 12/306,988

(22) PCT Filed: Jul. 4, 2007

(86) PCT No.: PCT/AT2007/000335

§ 371 (c)(1),
(2), (4) Date: Oct. 19, 2009

(87) PCT Pub. No.: WO2008/003112

PCT Pub. Date: Jan. 10, 2008

(65) Prior Publication Data

US 2010/0036920 A1    Feb. 11, 2010

(30) Foreign Application Priority Data

Jul. 5, 2006    (AT) .............................. A 1149/2006

(51) Int. Cl.
*G06F 15/16* (2006.01)
(52) U.S. Cl. ..................... 709/227; 709/203; 709/207; 709/217; 709/219
(58) Field of Classification Search .............. 709/203, 709/207, 217, 219, 227
See application file for complete search history.

(56) References Cited

U.S. PATENT DOCUMENTS

| 5,319,641 | A | * | 6/1994 | Fridrich et al. | ............... | 370/447 |
| 5,343,472 | A | * | 8/1994 | Michihira et al. | ........... | 370/445 |
| 5,524,213 | A | * | 6/1996 | Dais et al. | ................... | 709/207 |

FOREIGN PATENT DOCUMENTS

WO    WO 95/06378    3/1995

OTHER PUBLICATIONS

Leen et al., "TTCAN: a new time-triggered controller area network," Microprocessors and Microsystems, vol. 26, No. 2, Mar. 17, 2002, pp. 77-94.

(Continued)

*Primary Examiner*—Phuoc Nguyen
(74) *Attorney, Agent, or Firm*—RatnerPrestia

(57) ABSTRACT

Disclosed is a method for transmitting CAN messages via a CAN bus in a communication system including several network nodes with at least one respective CAN controller. According to the method, the authorization of a network mode to send a CAN message is arbitrated, an arbitration decision being made in a higher protocol layer than the transmission of the CAN message, and the CAN message is already sent by the transmitting network node, the latter providing a dominant level in the ACK field of the message. A network node which receives the CAN message does not generate a dominant level in the ACK field and does not send a complete error frame.

4 Claims, 4 Drawing Sheets

OTHER PUBLICATIONS

Almeida et al., "The FTT-CAN Protocol: Why and How," IEEE Transactions on Industrial Electronics, vol. 49, No. 6, Dec. 2002, pp. 1189-1201.

Verissimo et al., "How hard is hard real-time communication on field-buses?," 27th Annual International Symposium on Fault-Tolerant Computing, Seattle, WA, USA, Jun. 24, 1997, pp. 112-121.

Cena et al., "On the Performances of Two Popular Fieldbuses," IEEE International Workshop on Factory Communication Systems, Barcelona, Spain, Oct. 1, 1997, pp. 177-186.

International Search Report for PCT International Application No. PCT/AT2007/000335, mailed Sep. 27, 2007.

* cited by examiner

METHOD AND DEVICE FOR THE CREATION OF A COMMUNICATION SYSTEM BASED ON CAN COMMUNICATION CONTROLLERS FEATURING AN INCREASED DATA THROUGHPUT

This application is a U.S. National Phase Application of PCT International Application No. PCT/AT2007/000335 filed Jul. 4, 2007.

FIELD OF THE INVENTION

The present invention pertains to a method for transmitting messages in a communication system, which has a plurality of network nodes with at least one CAN controller each.

The present invention pertains, furthermore, to a communication system, which has a plurality of network nodes with at least one CAN controller each.

BACKGROUND

The technical terms and abbreviations used in this document correspond to the technical terminology used within the framework of "Controller Area Network Systems," "CAN" systems for short.

The use of many electronic control units (ECUs) in motor vehicles, but in other areas as well, requires a communication system with high data throughput. The requirements of data communication have hitherto been able to be extensively satisfied with the Controller Area Network (CAN) introduced by Bosch and described in the "CAN Specification Version 2.0, September 1991." The above-mentioned specification can be downloaded free of charge, for example, from http://www.can.bosch.com/docu/can2spec.pdf. The embodiment of new functions by the electronic unit (e.g., vehicle control systems) requires communication functions that go beyond the limits of the existing CAN systems. The data rate of current CAN networks is extensively limited by the delays in the bus drivers combined with the data lines. Concretely, the limiting factor is the need to synchronize all the CAN communication nodes located at the CAN bus to a fraction of the duration of one bit cell. Several protocol features specified by CAN Specification Version 2.0, which must be complied with by all CAN communication nodes, require simultaneity of CAN protocol-conform actions of the CAN communication nodes. This applies, in particular, to the acknowledgement of receipt common for the CAN protocol, the so-called acknowledge, and to arbitration.

FIG. 1 schematically shows the CAN message transmission process in a conventional CAN communication system. The transmission directions are indicated by arrows. A plurality of CAN communication nodes KK1, KK2 transmit their "CAN frames" simultaneously via a CAN bus, beginning with an arbitration field ARB with an "identifier segment" in order to jointly arrive at the decision on which CAN communication node KK1, KK2 is actually authorized to send a complete CAN message NAR. After the CAN communication node KK1 thus determined has transmitted data content DATA and check sum CRC of the CAN message NAR, all the CAN communication nodes KK2 active at the bus confirms the correctness of the check sum by a dominant level PEG during the acknowledgement phase of the message NAR. The term acknowledgment phase is used here synonymously for acknowledgment field (ACK field) or acknowledgment slot (ACK slot). If an error is recognized in the transmission by a receiver, this generates and sends an error frame.

The drawback of the conventional CAN communication systems is above all that the data rate that can be reached is substantially limited by the synchronization requirements resulting from the acknowledge process and the arbitration process and by the bidirectional message exchange during these phases.

BRIEF DESCRIPTION

One aspect of the invention is a method of the type mentioned in the introduction by an arbitration decision taking place in a higher protocol layer than the transmission of the CAN message, and by the CAN message being sent already by the transmitting network node with a dominant level in its ACK field and by a network node receiving the CAN message not sending either a dominant level in the ACK field or a complete error frame.

A solution according to the present invention increases the throughput of CAN bus systems that can be reached several times with a very low effort while preserving at the same time the compatibility with CAN test systems that are also monitoring at the bus. A message transmission always takes place in the solution according to the present invention in one direction only, namely, from the transmitter to the receiver. The present invention can be embodied with CAN controllers commonly used currently in a simple manner and requires hardly any appreciable extra cost in many cases.

To also make possible message transmission over a longer transmission distance, a message distribution means may be provided, which regenerates electrical signals on the CAN bus in terms of level and/or time response, using the fact that the direction of propagation of a message takes place in one direction only.

The above-mentioned object can also be accomplished with a communication system of the type described in the introduction, which is set up according to the present invention to make an arbitration decision on which network node is authorized to send in a higher protocol layer than the transmission of the CAN message, to send the CAN message already by the transmitting network node with a dominant level in its CK field, and to prevent a network node receiving the CAN message from generating a dominant level in the ACK field or from sending a complete error frame.

DESCRIPTION OF THE DRAWINGS

The present invention with its other advantages will be explained in more detail below on the basis of some nonlimiting exemplary embodiments, which are shown in the drawings. In the drawings, FIG. 1 schematically shows a conventional CAN transmission process, FIG. 2 schematically shows a procedure of an exemplary method according to the present invention, FIG. 3 schematically shows a first version of an exemplary communication system according to the present invention, and FIG. 4 schematically shows a second version of an exemplary communication system according to the present invention.

According to FIG. 2, an arbitration decision is made in the method according to the present invention in a higher protocol layer than the transmission of the CAN message. The CAN message NAR' is sent already by the transmitting network node KK1' with a dominant level PEG in its ACK field, and a network node KK2' receiving the CAN message does not send either a dominant level in the ACK field or a complete error frame.

Figure 1:
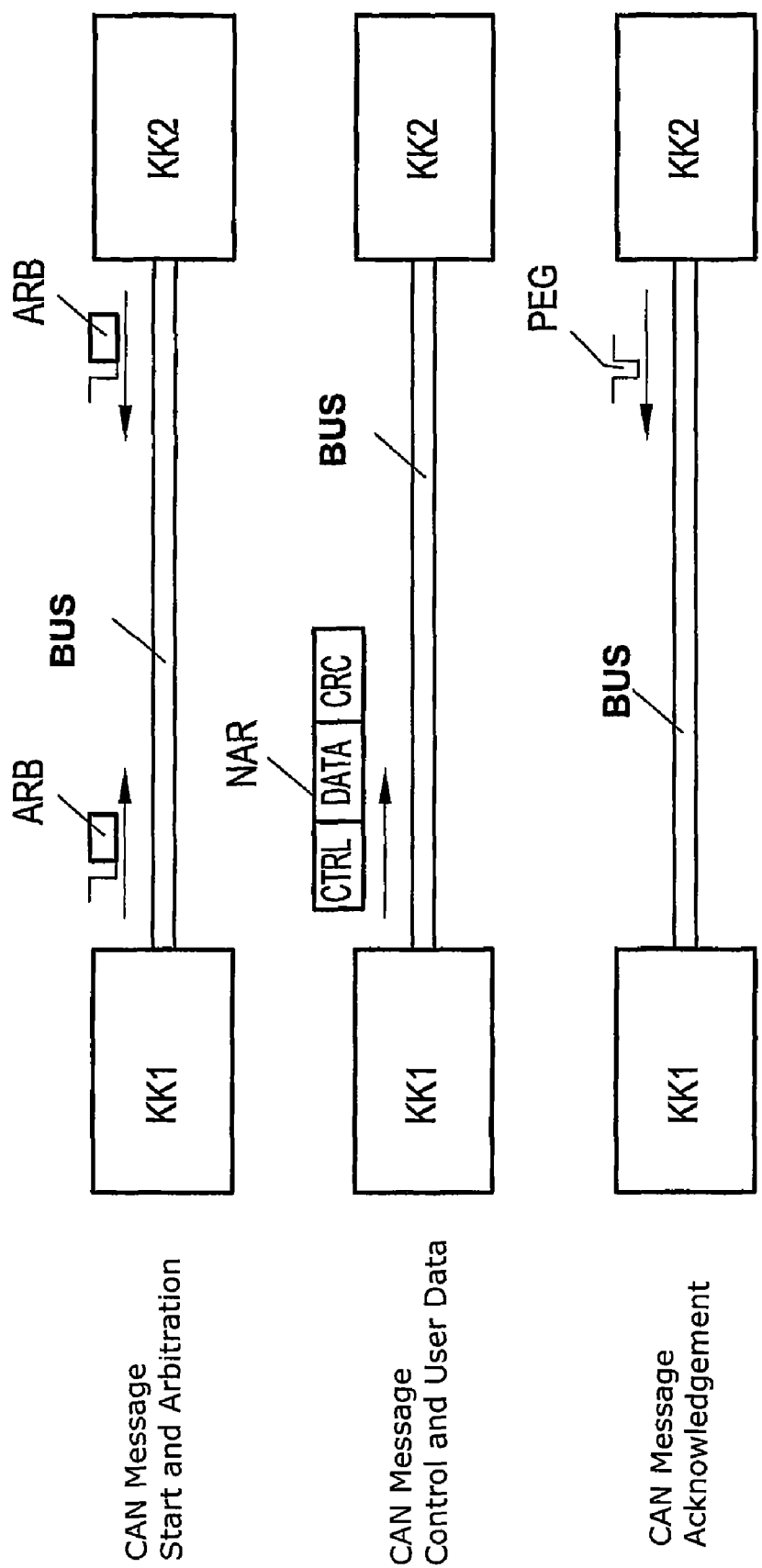
Figure 2:
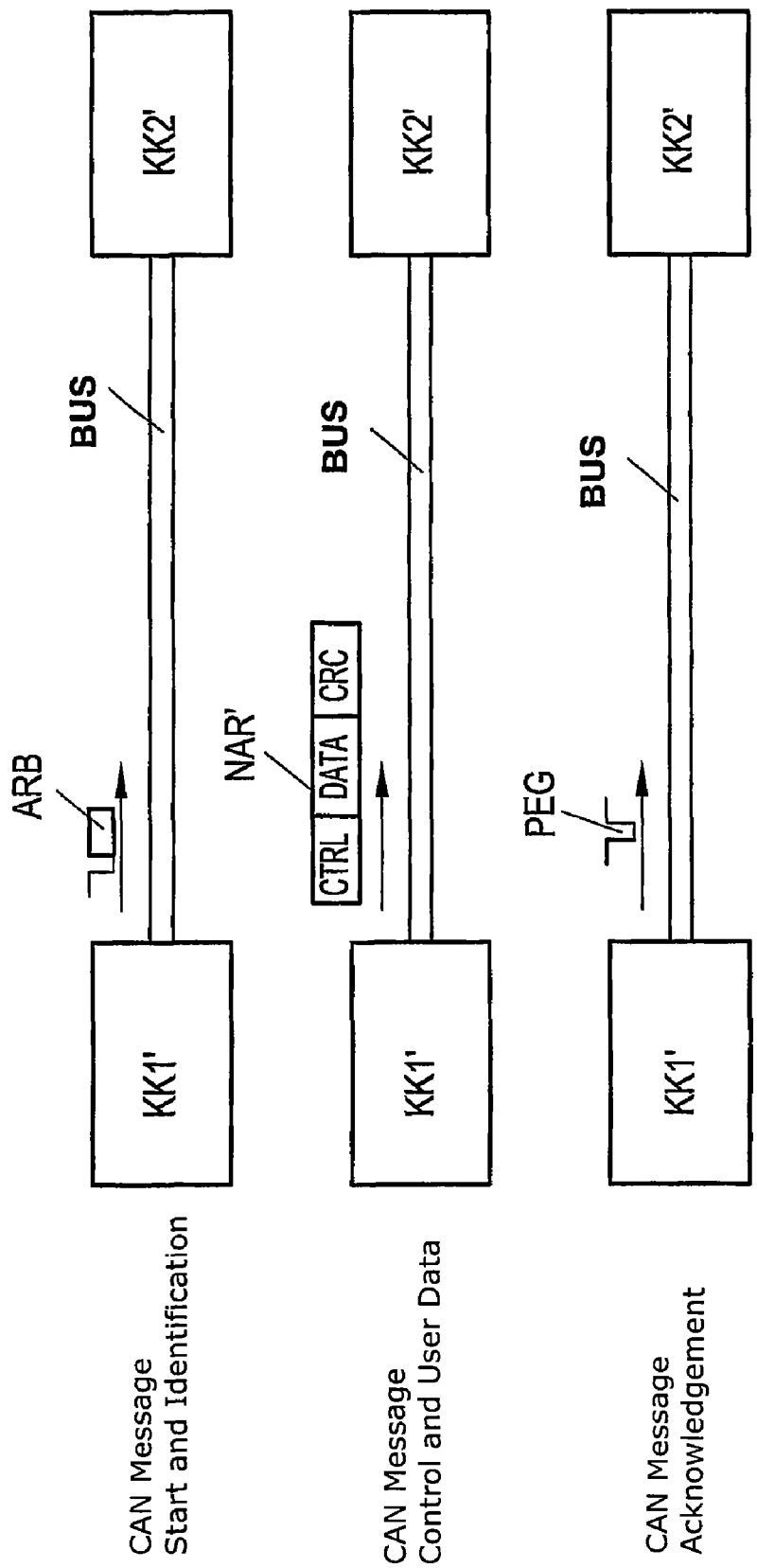
Figure 3:
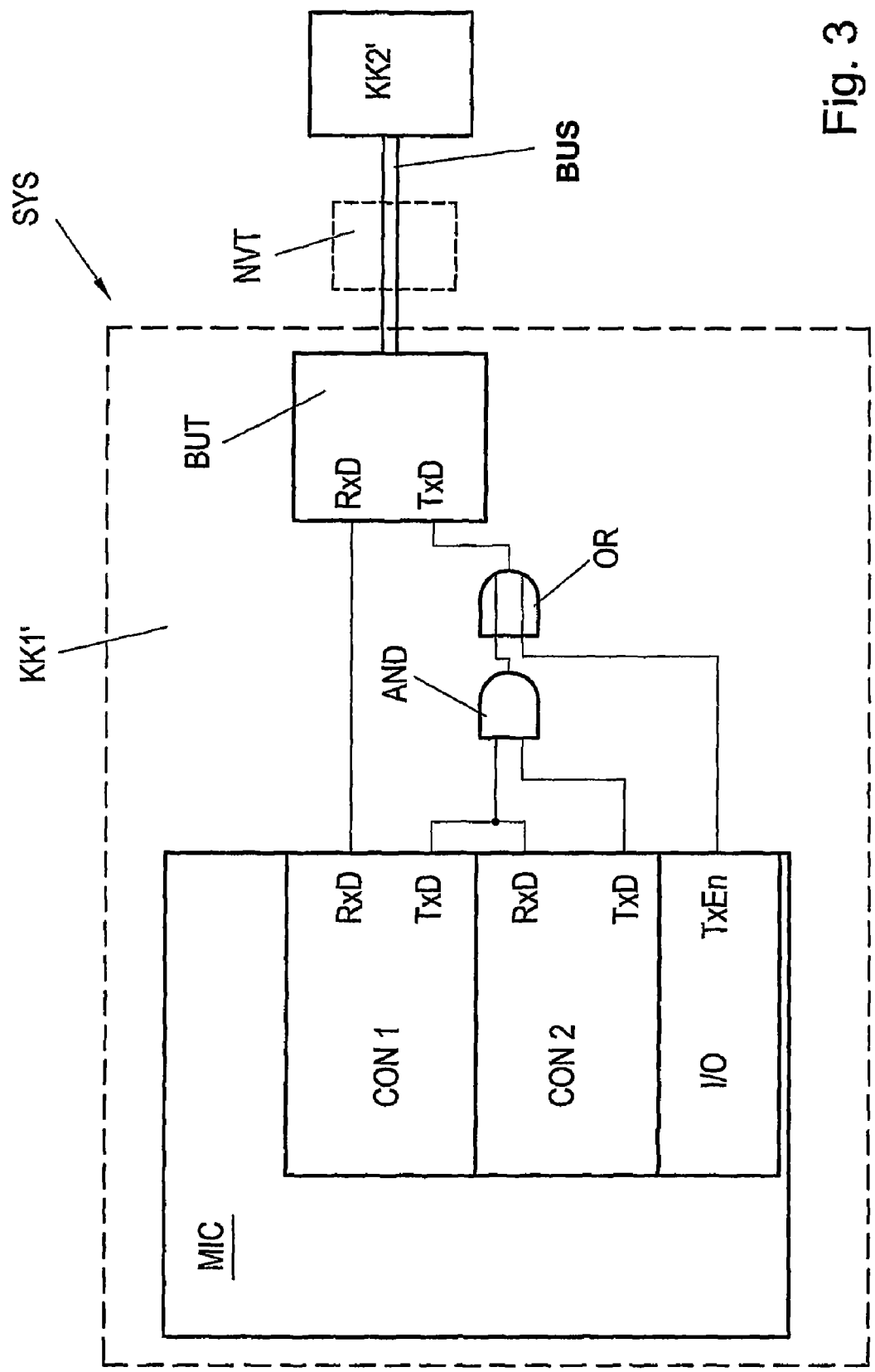
Figure 4:
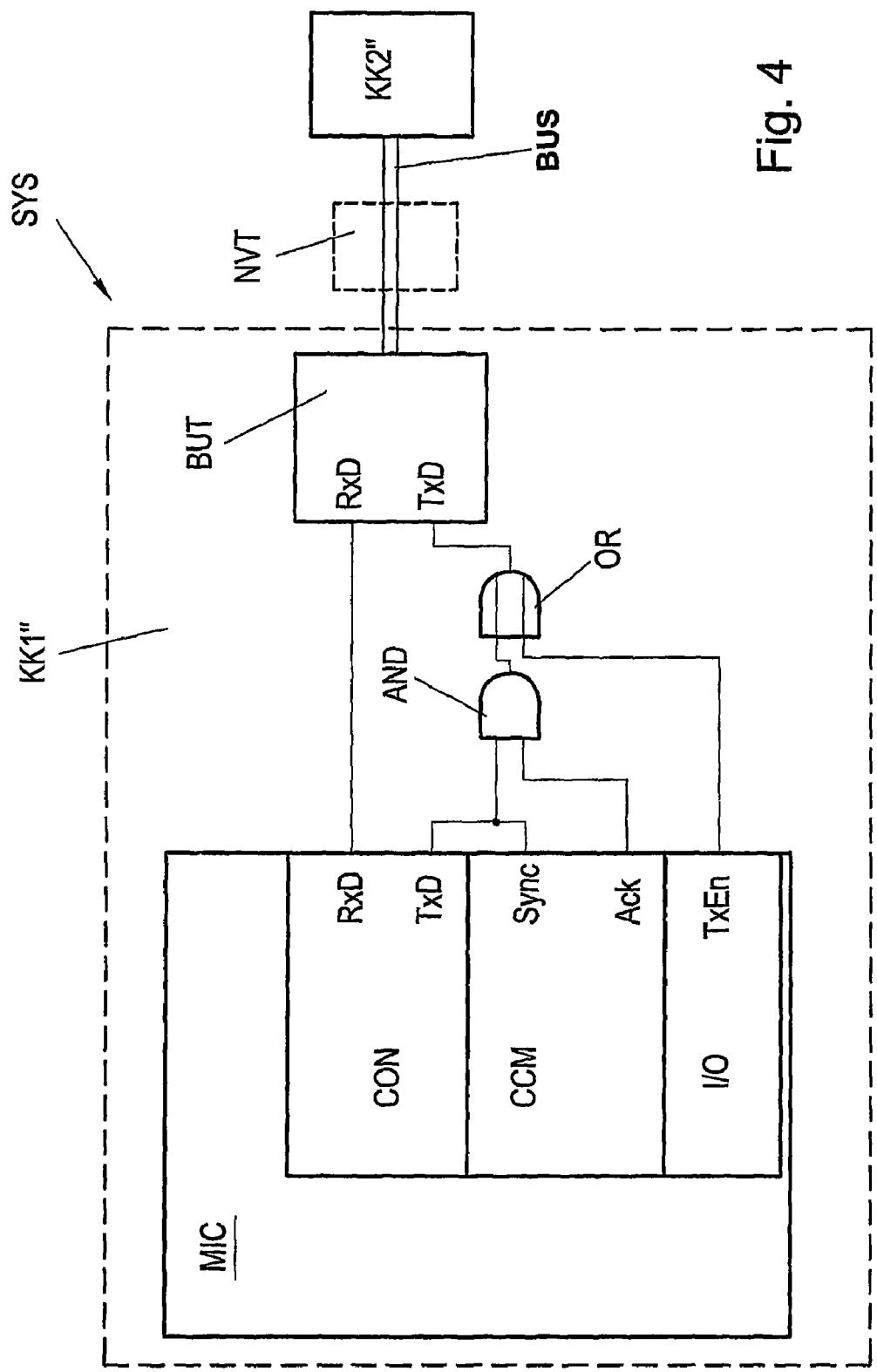

According to the variant of a communication system SYS according to the present invention, which is shown in FIGS. 3 and 4, the transmitting network node KK1' of a CAN message is modified such that a CAN message already provided with a dominant acknowledge bit is sent by it. At the same time, the receivers KK2' of a message are modified such that this does not attempt to confirm the correctness of a received message by setting a dominant level in the acknowledgment field. The nodes KK1', KK2' thus modified are used in an environment in which the arbitration is performed in a higher protocol layer. This is the case, for example, of a time-controlled system or of a master-slave system. The network nodes KK1' and KK2' correspond to one another in terms of their functional structure, even though they may have different physical embodiments. For example, one of the network nodes KK1' or KK1" may be embodied like the network node shown in FIG. 3, whereas the second network node KK2' or KK2" may be designed, for example, according to the embodiment shown in FIG. 4.

A (physical) message flow takes place in the solution according to the present invention during transmission of a CAN message - contrary to the prior-art methods or communication systems - in one direction only, namely, from the transmitting node KK1', KK1" to the receiving node KK2', KK2".

The modification according to the present invention of the communication nodes KK1', KK2', KK1", KK2" (transmitter/receiver) has the following effects:

a) The timing of the bus signals becomes markedly more uncritical compared to the conventional system. The overall transit time through two bus drivers determines the maximum data rate in conventional CAN systems. In systems in which the present invention is used, the difference of the overall transit times of a falling flank and a rising flank determines the maximum data rate. This is substantially smaller in common bus drivers than the overall transit time. The data rate that can be reached is thus increased.

b) In addition, it is possible to use bus drivers working with dominant/dominant levels. Only bus drivers with dominant/recessive levels can be used in conventional CAN systems. Bus drivers with dominant/dominant levels generally have a shorter delay and a less oblique position of the delay than those with dominant/recessive levels. The data rate that can be reached is increased by this as well.

The present invention can be embodied in various manners. Three variants will be proposed below. It is common to all variants that the arbitration of the CAN bus is controlled in a higher layer of the transmission protocol.

FIG. 3 schematically shows an embodiment of the present invention with the use of two CAN controllers CON1, CON2. According to this embodiment, network node KK1' has a microcontroller MIC and two CAN controllers CON1, CON2. The first CAN controller CON1 transmits and receives frames. The second CAN controller CON2, which is located in the same network node KK1' as the first CAN controller CON1, receives the transmitting current of the first CAN controller CON1. The input lines are designated by RxD and the output lines by TxD.

The second CAN controller CON2 generates the acknowledge bit for the transmission frames of the first CAN controller CON1. The acknowledge bit is attached to the transmitting frame by a logic AND link AND and then placed on the CAN bus BUS by the bus driver BUT. A correct CAN frame is now visible at the CAN bus BUS. To prevent the timing of a CAN frame thus generated from being distorted by further acknowledge bits, the transmission of all other network nodes KK2' in the communication system is prevented at this point in time through the transmit-enable TxEn line.

The result of the arbitration, which takes place on a higher protocol layer, is available in the microcontroller MIC, and a corresponding transmit-enable signal is generated as a function of the arbitration result. The algorithm according to which the arbitration takes place is of secondary importance for the physical embodiment of the present invention, the only thing that is essential here being that the result of the arbitration is obtained independently from the CAN controllers, because the value of the transmit-enable signal depends on the result of the arbitration. The transmit-enable signal of network node KK1' is activated only when the particular network node KK1' is not to send any message NAR. When the network node KK1 is not to transmit, a recessive level is present at the output of the OR link. However, since a dominant level must be present for the transmission of a CAN message NAR, no message NAR is sent by the BUS driver BUT in this case. If, by contrast, a CAN message NAR is to be transmitted, a transmit-enable signal, which corresponds to a dominant level, is generated by the microcontroller MIC. The transmit-enable signal and the output signal of the logic AND link AND are sent now to a logic OR link OR.

FIG. 4 shows an embodiment of the present invention by the use of a CAN controller CON and a compare/capture module CCM of a microcontroller. The acknowledge bit is generated in this case by the microcontroller MIC by this microcontroller MIC measuring the point in time of the "start of frame" of the transmission frame and generating the acknowledge bit at a given point in time. Aside from the manner of generation of the acknowledge bit, this variant is identical to the first one. It is a very cost effective implementation of the present invention, which can be embodied with conventional microcontrollers.

A third variant uses a CAN controller, which is set up, for example, by corresponding programming, to generate a frame with an acknowledge bit already placed and not to place an acknowledge bit on the bus in case of reception of a CAN message when it contains a frame with a valid check sum CRC.

To make it possible to enable the transmission of messages over longer distances, a message distribution means NVT, which regenerates electrical signals at the CAN bus in terms of level and/or time response, is provided. The message distribution means NVT utilizes the fact that the direction of propagation of a message NAR takes place in one direction only.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. A method for transmitting CAN messages via a CAN bus in a communication system, which has a plurality of network nodes each with a CAN controller, wherein an arbitration on the authorization of a network node to send a CAN message takes place, wherein an arbitration decision is made in a higher protocol layer than the transmission of the CAN message and the CAN message is sent already by the transmitting network node with a dominant level in its ACK field, and wherein a network node receiving the CAN message does not send either a dominant level in the ACK field or a complete error frame.

2. The method in accordance with claim 1, further comprising regenerating electrical signals on the CAN bus in terms of level and/or time response using a message distribution means, utilizing the fact that the direction of propagation of a message takes place in one direction only.

3. A communication system comprising:
- a plurality of network nodes each with at least one CAN controller,
- wherein the communication system is adapted to perform an arbitration on an authorization of a network node to send a CAN message, and
- wherein the communication system is further adapted to make an arbitration decision on which network node is authorized to send in a higher protocol layer than the transmission of the CAN message, to send the CAN message already by the transmitting network node with a dominant level in its ACK field and to prevent a network node receiving the CAN message from generating a dominant level in the ACK field or from sending a complete error frame.

4. The communication system in accordance with claim 3, further comprising a message distribution means, which regenerates electrical signals on the CAN bus in terms of level and/or time response utilizing the fact that the direction of propagation of a message takes place in one direction only.

* * * * *